United States Patent
Undy et al.

(10) Patent No.: US 6,711,671 B1
(45) Date of Patent: Mar. 23, 2004

(54) NON-SPECULATIVE INSTRUCTION FETCH IN SPECULATIVE PROCESSING

(75) Inventors: Stephen R. Undy, Ft Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/506,773

(22) Filed: Feb. 18, 2000

(51) Int. Cl.[7] .............................................. G06F 15/00
(52) U.S. Cl. ........................ 712/225; 712/226; 712/244
(58) Field of Search ................................. 712/235, 226, 712/227, 228, 244, 225

(56) References Cited

U.S. PATENT DOCUMENTS

| | | | |
|---|---|---|---|
| 5,437,017 A | * | 7/1995 | Moore et al. ................ 709/213 |
| 5,526,510 A | * | 6/1996 | Akkary et al. ............... 711/133 |
| 5,859,999 A | | 1/1999 | Morris et al. |
| 5,860,017 A | | 1/1999 | Sharangpani et al. |
| 5,864,692 A | * | 1/1999 | Faraboschi et al. ......... 712/216 |
| 6,119,218 A | * | 9/2000 | Arora et al. ................. 712/207 |
| 6,212,539 B1 | * | 4/2001 | Huck et al. .................. 708/495 |
| 6,263,488 B1 | * | 7/2001 | Fortin et al. ................ 717/127 |
| 6,292,934 B1 | * | 9/2001 | Davidson et al. ........... 717/158 |
| 6,349,384 B1 | * | 2/2002 | Key et al. .................... 712/242 |

OTHER PUBLICATIONS

Wolfe, A., "Patents shed light on Merced's Innards", Electronic Engineering Times, Feb. 15, 1999.

* cited by examiner

*Primary Examiner*—Richard L. Ellis
*Assistant Examiner*—Charles Harkness

(57) ABSTRACT

An apparatus for and a method of ensuring that a non-speculative instruction is not fetched into an execution pipeline, where the non-speculative instruction, if fetched, may cause a cache miss that causes potentially catastrophic speculative processing, e.g., speculative transfer of data from an I/O device. When a non-speculative instruction is scheduled for a fetch into the pipeline, a translation lookaside buffer (TLB) miss is made to occur, e.g., by preventing the lowest level TLB from storing any page table entry (PTE) associated with any of the non-speculative instructions. The TLB miss prevents the occurrence of any cache miss, and causes a micro-fault to be injected into the pipeline. The micro-fault includes an address corresponding to the subject non-speculative instruction, and when it reaches the end of the pipeline, causes a redirect of instruction flow of the pipeline to the address, and thus the non-speculative instruction is fetched and executed in a non-speculative manner.

17 Claims, 3 Drawing Sheets

NON-SPECULATIVE INSTRUCTION FETCH IN SPECULATIVE PROCESSING

TECHNICAL FIELD

The invention relates to computer processors and processing systems. More particularly, the invention relates to enforcement of a non-speculative processing policy for execution of certain groups of instructions in a speculative processing environment.

BACKGROUND ART

Speculative processing (also referred to as Speculative Access or Speculative Addressing) is a technique that is utilized by nearly all modern high performance processors to improve system performance. In a processor system that implements the speculative processing technique, the CPU, when it is not busy, makes a "guess" of, or speculates, the next instruction (or a sequence of instructions) that is likely to be executed, and actually initiates the execution of the guessed instruction in advance, which includes, inter alia, reading, or fetching, the instruction from storage.

Speculation is the result of two primary causes. The first cause is that modem branch prediction techniques allow processors to make fairly accurate guesses as to the outcome of a branch instruction before said branch instruction finishes executing. That is, before a branch instruction completes, the processor will attempt to guess whether the next instruction to execute will be from the branch target or from the next sequential instruction following the branch and the processor will immediately begin speculatively fetching instructions from that predicted path. If the processor predicted incorrectly, the instruction fetched after the branch will be "flushed" out of the pipeline and the processor will begin fetching from the correct path. This is termed a "branch misprediction".

The second cause of speculation is that processors typically implement an interruption mechanism. An interrupt, in general, causes a change in control flow in response to a condition detected by the processor hardware that requires assistance, typically provided by a software interrupt handler. An example of an interruption would be a TLB miss fault, which requires a piece of software called the TLB miss fault handler to be executed. Interruptions cannot be predicted when an instruction is fetched, therefore all instructions after the instruction causing the interruption will have been fetch speculatively and will need be flushed (similar to a branch misprediction).

The prediction is generally accurate most of the time, so that the speculative processing does improve the performance of the computer system. Even when the prediction was inaccurate, the result of the execution of the extra instructions is simply discarded, and, for the most part, no harm was done, i.e., the CPU would have been idle in any event.

Unfortunately, however, there are some types of operations that, if processed speculatively, may result in a catastrophic problem. For example, I/O operations, i.e., reading from a peripheral device, e.g., a hard disk, a sound card, a keyboard or a display or the like, must not be processed in speculative manner. This is because the I/O devices and the CPU typically communicate via a buffer. That is the data being exchanged between the CPU and an I/O device is temporarily stored in a buffer, typically in a first-in-first-out (FIFO) device, and is lost after being read once.

For example, a hard disk controller would place data in an interface buffer for transmittal to the CPU. Once the CPU reads the data, the hard disk controller assumes that the CPU has received and properly used the data, arid starts to fill the buffer with newer data. Thus, if the disk read was speculatively processed when the CPU neither needed nor was ready to use the data at that time, the data is lost, and would not be available when the CPU actually needs it at a later time. This can lead to a catastrophic error , e.g., a missing data block.

Therefore, certain instructions, e.g., instructions referencing addresses mapped to I/O devices, are marked "non-speculative instructions", and are prevented from being speculatively executed. However, almost all modern computer systems also utilize a pipelining technique, and thus fetch instructions many clock cycles before the instructions are actually executed. A fetched instruction in a pipeline system does not always get executed. For example, the pipeline may be flushed after an interrupt, or the program flow may branch to another instruction, before the fetched instruction reaches the execution stage.

When a non-speculative instruction is fetched as described above, a similar result may occur as when the non-speculative instruction had been speculatively processed. This is because when an instruction is fetched, the cache system snoops the bus, and if the address being referenced is not found in the cache, it would signal a cache miss condition. The cache miss initiates a transfer of data from the memory and/or I/O devices. Thus, a mere fetching of an instruction may result in an emptying of an I/O interface buffer. When the I/O instruction is ultimately not executed in the pipeline for, e.g., reasons described above, the data that was in the I/O interface buffer is lost. Thus, in a pipelined system, it is critical to ensure that a non-speculative instruction does not cause a cache miss to occur.

A typical way in which a non-speculative instruction is prevented from being fetched is to halt the fetching of instructions into the pipeline altogether, until the instruction immediately preceding the non-speculative instruction is executed, thus ensuring that the non-speculative instruction will be executed, i.e., no speculative processing occurs.

For example, as shown FIG. 1, instructions are fetched by the fetch engine 101 into the execution pipeline 105 from a hierarchy of memory, e.g., the cache 103, memory 104 and/or a hard disk (not shown) and the like, in a manner well known to those familiar with pipelined processor architecture. The Translation Lookaside Buffer (TLB) 102 contains a subset of page table entries (PTE), which are typically stored in the main memory. The PTEs allow a translation from a virtual address to the corresponding physical address. The TLB, which is a smaller and faster memory than the main memory, acts similar to a cache memory with regard to the PTE, and thus speeds up the address translation process.

As previously mentioned, the non-speculative instructions are identifiable by, e.g., having one or more memory pages marked as non-speculative (e.g., the non-speculative memory block 107), and monitoring any access to those marked locations. When the next instruction to be fetched is identified as a non-speculative instruction, the fetch engine 101 halts before fetching the non-speculative instruction, and holds the subject non-speculative instruction at a stage of the pipeline 105 at which no cache miss due to the non-speculative instruction can occur. Then, the fetch engine 101 fills the pipeline 105 with "bubbles", which may be any inconsequential instructions, e.g., No-Op (No Operations) or the like. When the restart logic detects the retirement of the instruction immediately preceding the subject non-speculative instruction from the pipeline 105, the subject non-speculative instruction is guaranteed to be executed next (i.e., the execution of the non-speculative instruction is now guaranteed to be non-speculative). Accordingly, the restart logic 105 sends a restart signal to the fetch engine 101 to restart the fetching, at which point the subject non-speculative instruction enters and proceeds through the pipeline 105 to be eventually executed.

While the above described method does prevent a catastrophic error resulting from a fetching of a non-speculative instruction, it does so at a significant expense, namely the extra hardware to implement the halt condition and/or the restart logic 106.

Thus, what is needed is an efficient mechanism to ensure that no non-speculative instructions are fetched before a guaranteed execution thereof without increasing the system complexity.

SUMMARY OF THE INVENTION

A method and an apparatus for ensuring that a non-speculative instruction does not cause a cache miss condition that may cause a catastrophic error is described. More particularly, a method of, and an apparatus for, ensuring fetching of a non-speculative instruction after execution thereof is guaranteed in a processor system having a pipeline comprises injecting a micro-fault into the pipeline in place of the non-speculative instruction, the micro-fault having encoded therein an associated address, the micro-fault causing a re-direction of an instruction flow in the pipeline to the associated address when the micro-fault is executed in the pipeline.

DESCRIPTION OF DRAWINGS

Features and advantages of the present invention will become apparent to those skilled in the art from the following description with reference to the drawings, in which.

DETAILED DESCRIPTION OF PREFERRED EMBODIMENTS

An apparatus for, and a method of, ensuring that no non-speculative instruction is fetched into an execution pipeline, where the non-speculative instruction, if fetched, may cause a cache miss condition that causes a potentially catastrophic speculative processing, e.g., a speculative transfer of data from an I/O device is described.

When a non-speculative instruction is scheduled for a fetch into the pipeline, a translation lookaside buffer (TLB) miss is caused to occur. The TLB miss while referencing a non-speculative instruction may be ensured by, e.g., as is the case in the preferred embodiment, ensuring that the lowest level TLB of a multi-level TLB does not contain therein any page table entry (PTE) associated with any of the non-speculative instructions. It should be apparent to those familiar with design of memory systems that the TLB miss may be caused by any other ways, e.g., by providing a logic circuit to cause, and/or generate the necessary flags and signals for, the TLB miss when a non-speculative instruction is being referenced for fetching into the pipeline.

The TLB miss prevents the occurrence of any cache miss, and causes a micro-fault to be injected into the pipeline. A micro-fault may be, for example, merely one type of an interruption that can be signaled on an instruction reference. In the case of a micro-fault, the only assistance needed by the interruption is to have the instruction reference re-attempted.

Figure 1:
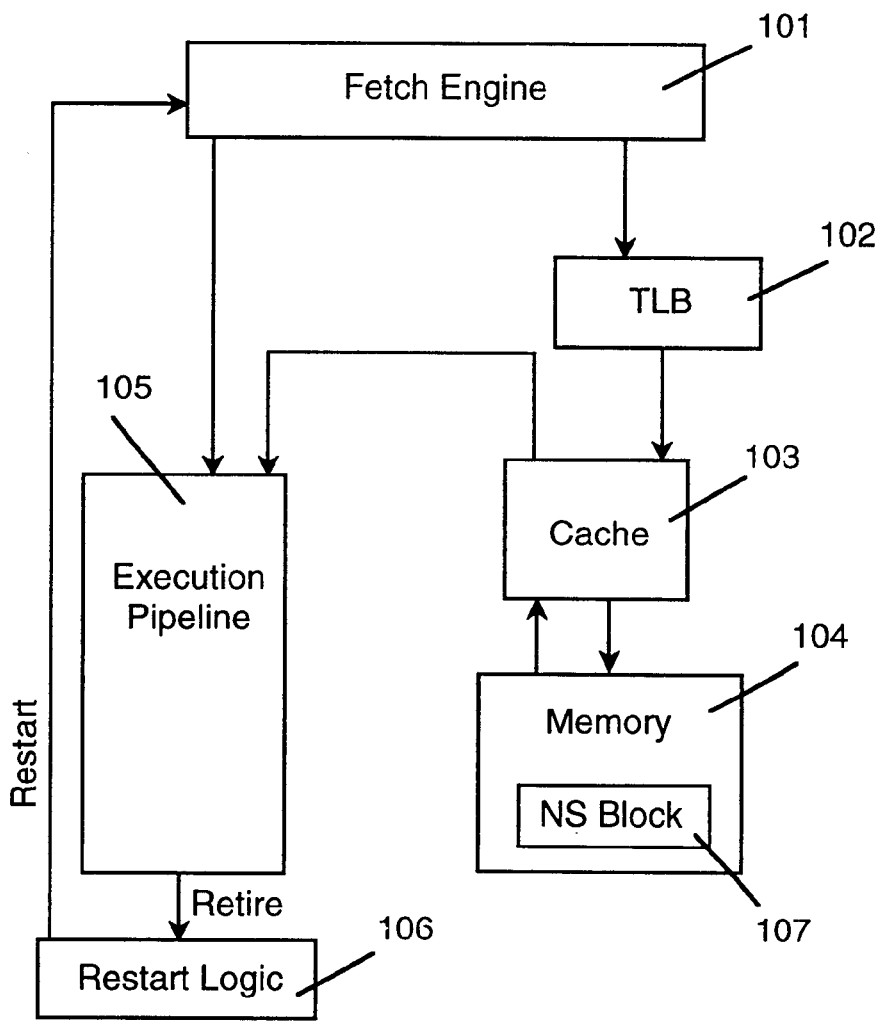
FIG. 1 is a block diagram of a conventional pipelined processor system having a restart logic to signal the fetch engine to restart fetching of instructions after a halt condition due to an encounter of a non-speculative instruction.
Figure 2:
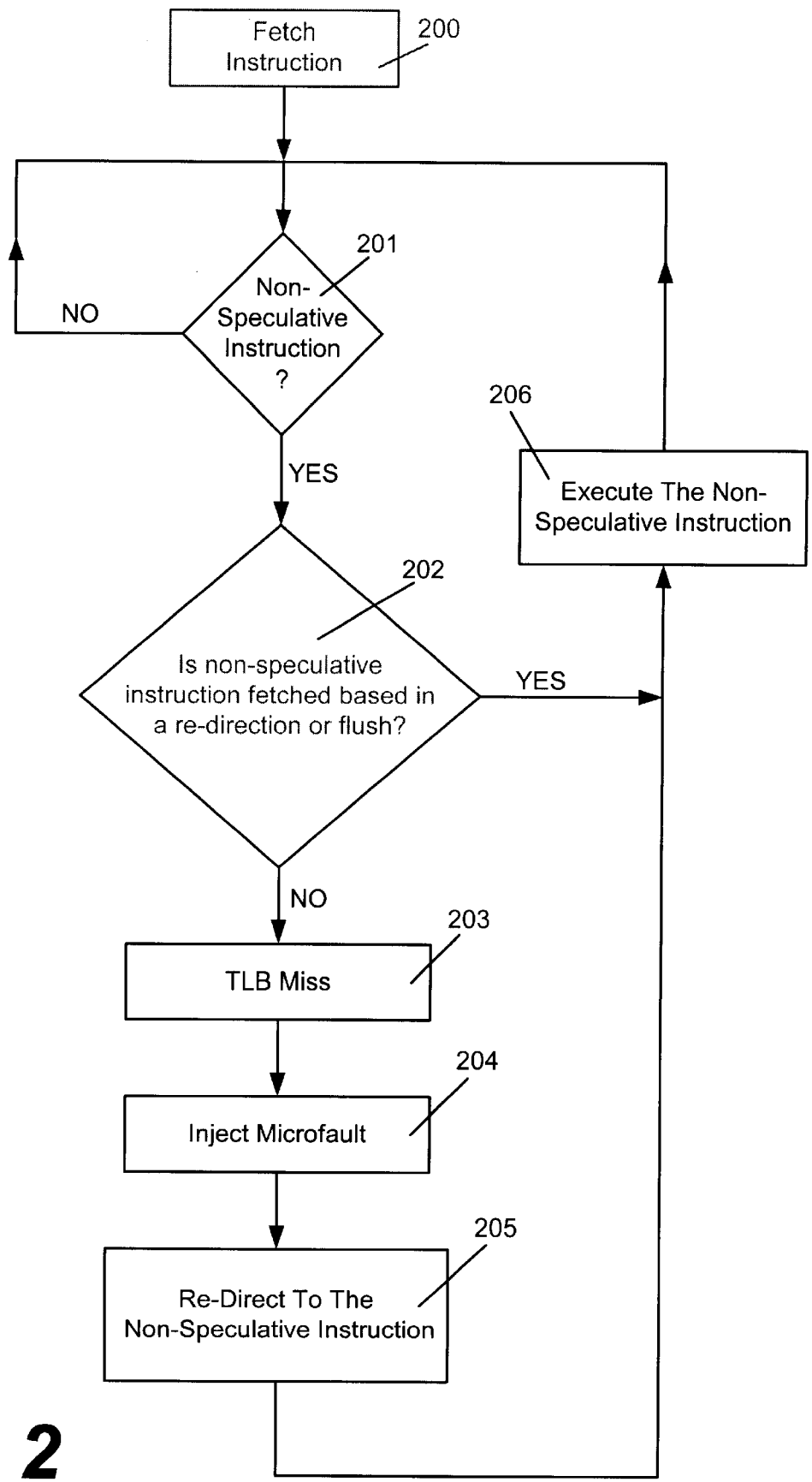
FIG. 2 is an exemplary flow diagram of the non-fetching of non-speculative instructions ensuring method.

The micro-fault includes an address corresponding to the subject non-speculative instruction. When it reaches the end of the pipeline, the micro-fault causes a re-direct of instruction flow of the pipeline to the address contained in the micro-fault. Thus, the non-speculative instruction is fetched again and executed, as a result of the micro-fault. In particular, an exemplary embodiment of the non-fetching of non-speculative instructions method in accordance with the principle of the present invention is shown in FIG. 2. Initially, an instruction is fetched in step 200. In step 201, a determination is made whether the instruction presently scheduled to be fetched is a non-speculative instruction. The determination can be made, e.g., by comparing the address (es) being accessed by the instruction and/or the address of the instruction itself, with a range of addresses (can be either virtual or physical) memory locations that are previously identified as non-speculative processing memory block.

If it was determined, in step 201, that the instruction being fetched is not a non-speculative instruction, the instruction is fetched and executed in a manner known to those familiar with pipelined execution of instructions. After, execution of the instruction, the process according to the present inventive method returns to step 201, which is repeated for the next sequential instruction scheduled to be fetched.

If on the other hand, it was determined that the instruction being fetched is a non-speculative instruction, then another determination is made in step 202. Step 202 determines whether the subject non-speculative instruction is being fetched as a result of a pipeline flush and re-direct operation (e.g., due to an interruption and/or mispredicted branch, or the like). If the subject non-speculative instruction is being fetched as a result of a pipeline flush and re-direct operation, then the non-speculative instruction is the next instruction to be executed, and the execution thereof is thus guaranteed. Thus, if the result of the determination in step 202 was affirmative, the process proceeds to step 206 in which the non-speculative instruction is immediately fetched and executed.

If, on the other hand, the non-speculative instruction is being fetched not as a result of a pipeline re-direct operation (i.e., the determination in step 202 was negative), then the process proceeds to step 203 in which a translation-lookaside-buffer (TLB) miss is caused. In a preferred embodiment of the present invention, an automatic occurrence of a TLB miss upon a reference to the subject non-speculative instruction is ensured by preventing the lowest level TLB of a multi-level TLB system from storing any page table entry (PTE) associated with the non-speculative instructions, i.e., the page table entries associated with the non-speculative processing memory block 107.

Because, with a TLB miss, a cache miss cannot be handled (due to the inability to translate a virtual address to a corresponding physical address), no cache miss related data request will result. In a system that allows caching of data from a memory block marked as non-speculative, e.g., the non-speculative processing memory block 107, it can be ensured that no data transfer from the memory and/or I/O devices will occur as a result of the TLB miss. Thus, in the case of the cache-able non-speculative memory block, the non-speculative instruction may be allowed to be immediately fetched into the pipeline without a chance of causing a catastrophic speculative data transfer. Thus, in a system that implements a cache-able non-speculative memory block, the process flow may proceed to the step 206, i.e., skipping steps 203 through 205.

Figure 3:
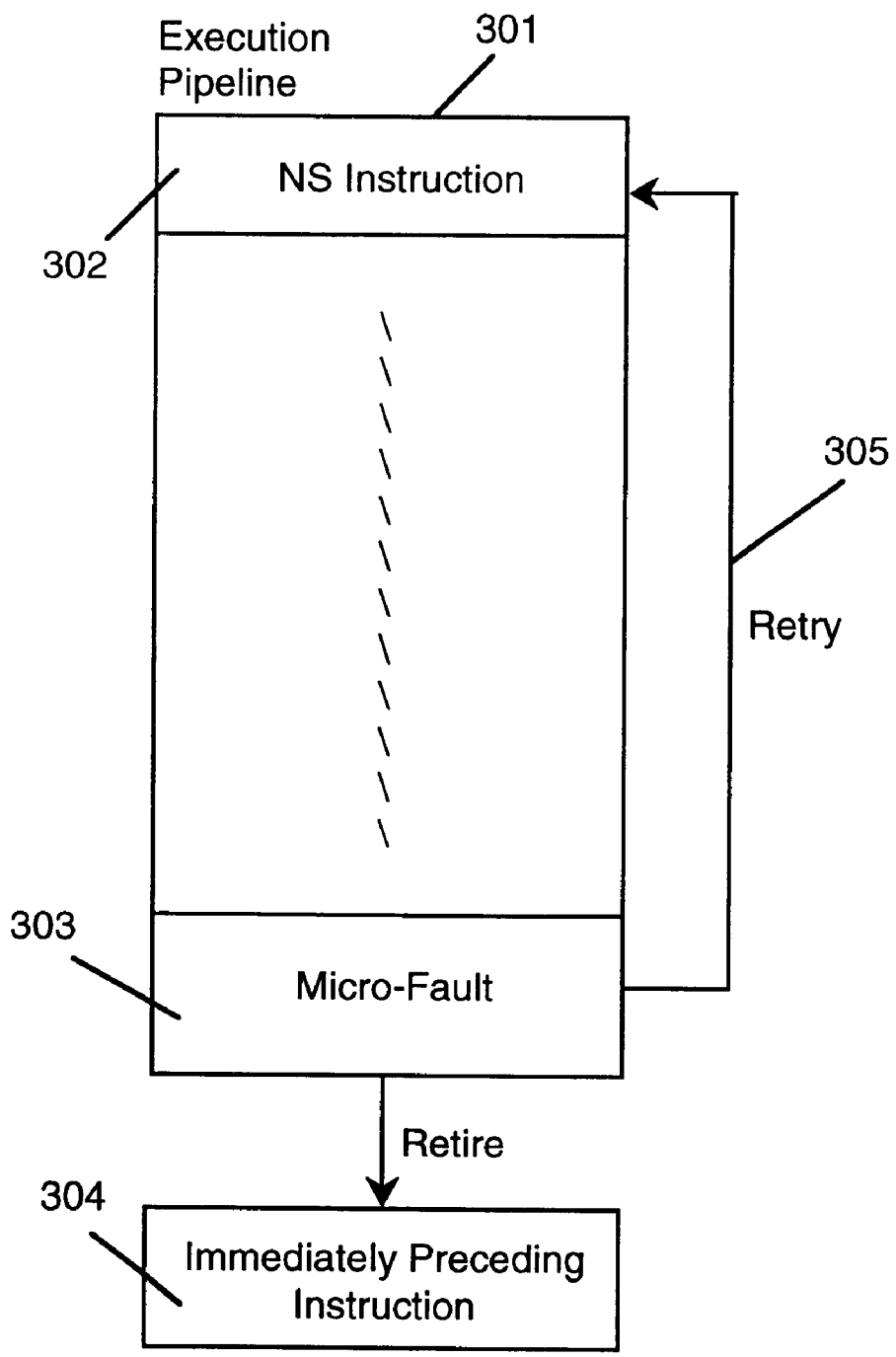
FIG. 3 is a block diagram showing the relevant portions of the execution pipeline having injected thereto a micro-fault.

However, a non-speculative memory block is also typically marked as non-cache-able. In the case of a non-cache-able non-speculative memory block, the non-speculative instruction must not be allowed to enter a stage of the pipeline, because it may cause a catastrophic speculative data transfer to occur. The TLB fault handler in a non-cache-able non-speculative memory block system, when the TLB miss is a result of a non-speculative instruction fetch, injects a micro-fault into the execution pipeline in step 204. The more typical case of a non-cache-able non-speculative memory block is shown in FIG. 3, in which a micro-fault 303 is injected into the execution pipeline 301 at a stage immediately following the preceding instruction 304. The preceding instruction 304 is the instruction that immediately precedes the subject non-speculative instruction in the scheduled instruction flow. When the immediately preceding instruction 304 retires from the pipeline 301, the micro-fault 303 is executed next. In this way, the non-speculative instruction 302 is not executed when the immediately preceding instruction 304 retires, but instead the micro-fault 303 is executed next.

In a preferred embodiment shown in FIG. 3, the micro-fault 303 causes the execution pipeline 301 to "retry" the non-speculative instruction 302, which is fed into the pipeline 301 as a result of the re-try. The re-try process 305 is handled within the execution pipeline, and thus does not require any communication from the execution pipeline to the instruction fetch engine. For example, the micro-fault 303 may be an unconditional branch instruction having the address of (or a pointer to) the non-speculative instruction 302 as the target address (e.g. in the immediate field of the branch instruction), and re-directs the instruction flow in the pipeline to the non-speculative instruction 302 in step 205.

Finally, in step 206, the non-speculative instruction is executed, and the process continues to step 200 with the next instruction to be fetched. When the micro-fault in accordance with the principles of the present invention reaches the end of the pipeline, and is executed, it is ensured that all instructions prior to the subject non-speculative instruction have executed successfully, and that the non-speculative instruction is in fact guaranteed to be executed. That is, if any of the instruction preceding the non-speculative instruction 302 had caused an interruption and/or a branch, the pipeline 301 would have been flushed, and the micro-fault 303 would not have reached the end of the pipeline 301.

As can be appreciated, in this exemplary embodiment, a mechanism is provided to ensure that a non-speculative instruction does not cause a cache miss, and thus potentially cause a catastrophic missing data condition, in a pipelined processor system without adding any extra hardware that increases system complexity and/or causes performance degradation.

What is claimed is:

1. A method of fetching a non-speculative instruction in a speculative processor system having a pipeline, comprising:

injecting a micro-fault into said pipeline in place of said non-speculative instruction, while instructions are flowing through said pipeline, said micro-fault having encoded therein an associated address;

wherein said micro-fault causes a re-direction of an instruction flow in said pipeline to said associated address.

2. The method fetching a non-speculative instruction in accordance with claim 1, wherein:

said micro-fault is a branch instruction.

3. The method of fetching a non-speculative instruction in accordance with claim 1, wherein:

said associated address points to said non-speculative instruction.

4. The method of fetching a non-speculative instruction in accordance with claim 1, further comprising:

causing a translation lookaside buffer (TLB) miss in light of a reference to said non-speculative instruction.

5. The method of fetching a non-speculative instruction in accordance with claim 4, wherein said step of causing a translation lookaside buffer (TLB) miss comprises:

preventing a lowest level translation lookaside buffer (TLB) from having translation information with respect to said non-speculative instruction.

6. The method of fetching a non-speculative instruction in accordance with claim 1, further comprising:

determining whether said non-speculative instruction is being fetched as a result of a pipeline flush and re-direct operation.

7. An apparatus for fetching a non-speculative instruction in a speculative processor system having a pipeline, comprising:

means for injecting a micro-fault into said pipeline in place of said non-speculative instruction, while instructions are flowing through said pipeline, said micro-fault having encoded therein an associated address;

wherein said micro-fault causes a re-direction of an instruction flow in said pipeline to said associated address.

8. The apparatus for fetching a non-speculative instruction in accordance with claim 7, wherein:

said micro-fault is a branch instruction.

9. The apparatus for fetching a non-speculative instruction in accordance with claim 7, wherein:

said associated address points to said non-speculative instruction.

10. The apparatus for fetching a non-speculative instruction in accordance with claim 7, further comprising:

means for causing a translation-lookaside-buffer (TLB) miss in light of a reference to said non-speculative instruction.

11. The apparatus for fetching a non-speculative instruction in accordance with claim 10, wherein:

a lowest level of said translation-lookaside-buffer (TLB) has stored therein no translation information associated with said non-speculative instruction.

12. The apparatus of fetching a non-speculative instruction in accordance with claim 7, further comprising:

determining whether said non-speculative instruction is being fetched as a result of a pipeline flush and re-direct operation.

13. A method of ensuring fetching of a non-speculative instruction after execution thereof is guaranteed in a speculative processor system having a pipeline, comprising:

causing a translation lookaside buffer (TLB) miss in light of a reference to said non-speculative instruction;

injecting one or more inconsequential instructions into said pipeline in place of said non-speculative instruction, while instructions are flowing through said pipeline; and injecting said non-speculative instruction immediately after a last one of said one or more inconsequential instructions.

14. The method of fetching a non-speculative instruction in accordance with claim 13, wherein said step of causing a table lookaside buffer (TLB) miss comprises:

preventing a lowest level translation lookaside buffer (TLB) from having translation information with respect to said non-speculative instruction.

15. The method of fetching a non-speculative instruction in accordance with claim 13, further comprising:

determining whether said non-speculative instruction is being fetched as a result of a pipeline flush and re-direct operation.

16. A method of fetching a non-speculative instruction in a speculative processor system having a pipeline, comprising:

determining if an instruction is a non-speculative or speculative instruction; and, if the instruction is a non-speculative instruction, injecting a micro-fault into said pipeline in place of said non-speculative instruction, said micro-fault having encoded therein an associated address;

wherein said micro-fault causes a re-direction of an instruction flow in said pipeline to said associated address.

17. A method of ensuring fetching of a non-speculative instruction after execution thereof is guaranteed in a speculative processor system having a pipeline, comprising:

determining if an instruction is a non-speculative or speculative instruction;

if the instruction is a non-speculative instruction, causing a translation lookaside buffer (TLB) miss in light of a reference to said non-speculative instruction;

injecting one or more inconsequential instructions into said pipeline in place of said non-speculative instruction; and injecting said non-speculative instruction immediately after a last one of said one or
more inconsequential instructions.

* * * * *